UNITED STATES PATENT OFFICE.

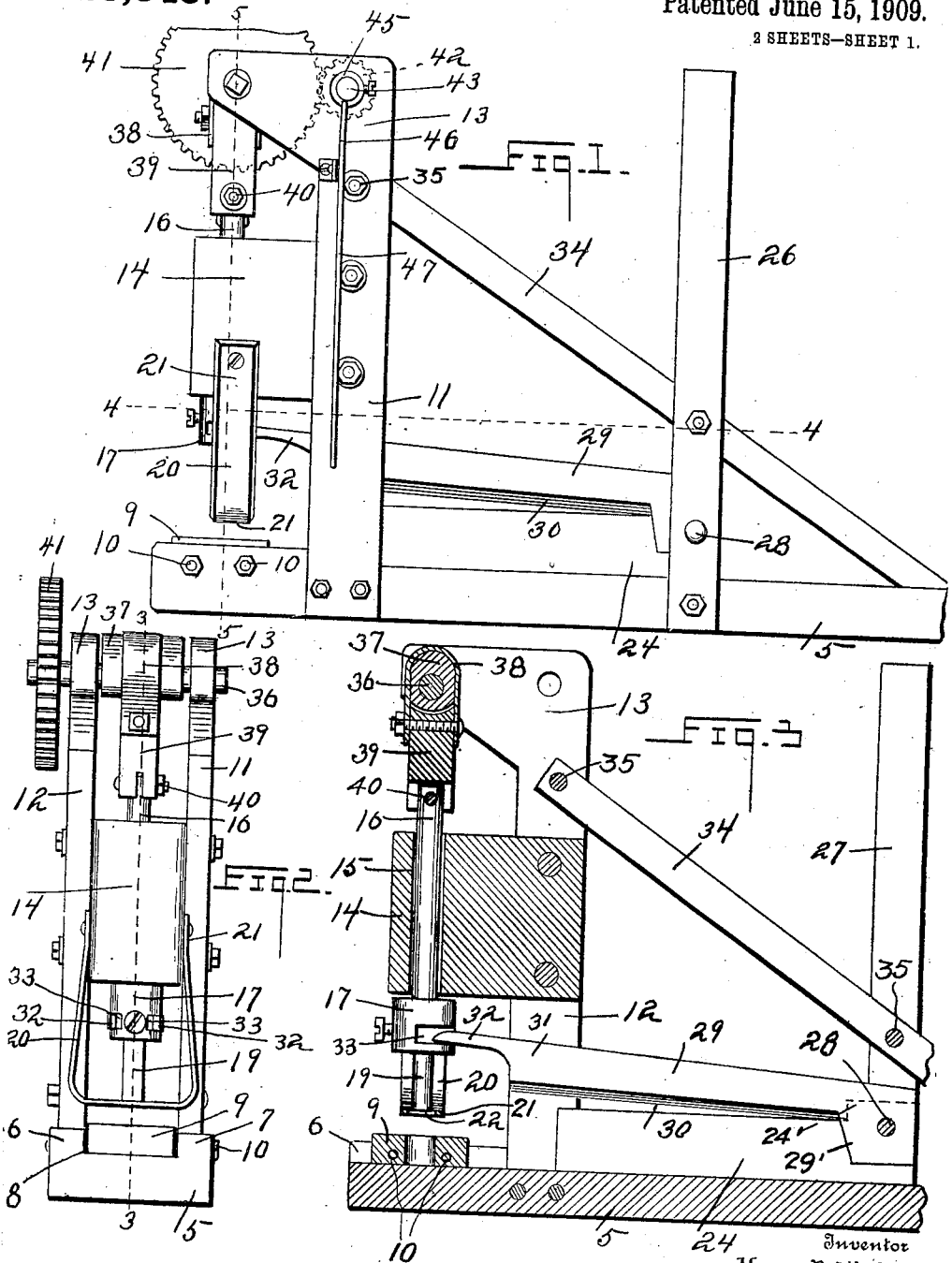

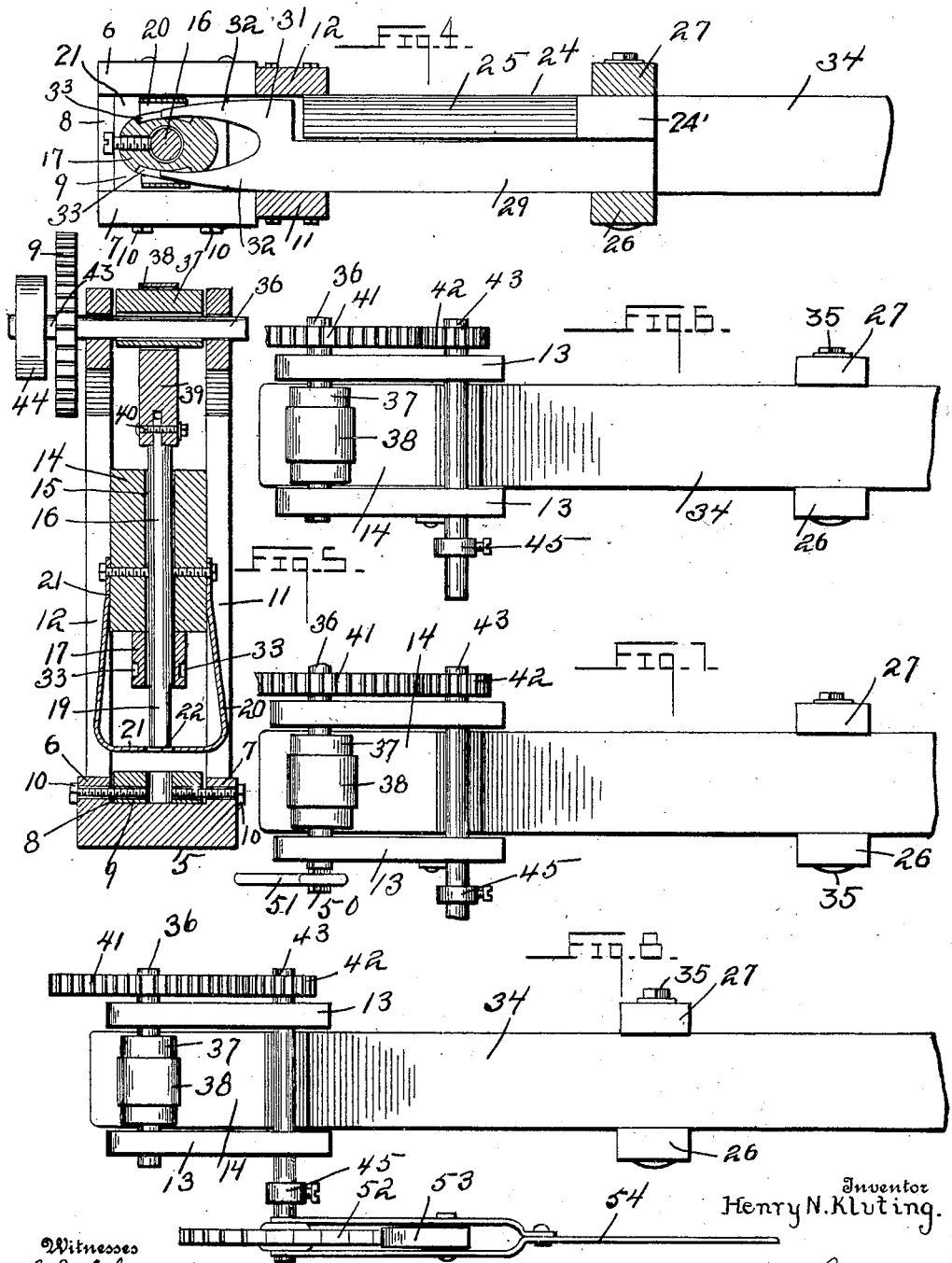

HENRY N. KLUTING, OF PALMYRA, ILLINOIS, ASSIGNOR OF ONE-HALF TO HORACE A. COLEMAN, OF PALMYRA, ILLINOIS.

COMBINED PUNCHING AND SHEARING MACHINE.

No. 925,348.　　　　Specification of Letters Patent.　　　Patented June 15, 1909.

Application filed June 12, 1908.　Serial No. 438,221.

*To all whom it may concern:*

Be it known that I, HENRY N. KLUTING, a citizen of the United States, residing at Palmyra, in the county of Macoupin and State of Illinois, have invented certain new and useful Improvements in Combined Punching and Shearing Machines, of which the following is a specification.

This invention relates to the class of cutting and punching machines, and more particularly to a machine for punching and shearing metal, and has for an object to provide a machine of this character including a reciprocating cutting tool adapted for operation for movement of one member of the shears.

A further object of this invention is to provide a machine of the above described character which may be conveniently transformed from a motor operated machine to a manually operated machine.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views, Figure 1 is a side elevational view of the present machine, Fig. 2 is a front view, Fig. 3 is a vertical sectional view on the line 3—3 of Fig. 2, Fig. 4 is a horizontal sectional view on the line 4—4 of Fig. 1, Fig. 5 is a transverse sectional view on the line 5—5 of Fig. 1, Fig. 6 is a top plan view, Fig. 7 is a view similar to Fig. 6 showing a slightly modified form of my invention, Fig. 8 is a view similar to Fig. 7 showing a further modified form of my invention.

Referring now more particularly to the drawings, there is shown a combined punching and shearing machine comprising a base member 5 which is provided at its front end with vertically disposed spaced flanged portions 6 and 7 respectively which thus form a longitudinally disposed groove 8 for the reception of a die 9 which is held in place preferably by means of transversely disposed bolts 10 engaged in passages formed in the flanged portions 7 and 6, and in passages formed in the die.

Rearwardly of the flanged portions 6 and 7, the base member is provided with vertically disposed standards 11 and 12 each being provided at its upper end with a forwardly projecting enlargement 13. The standards 11 and 12 receive a guide member 14 disposed with a portion above the groove 8, and this guide member is provided with a vertically disposed passage 15 for the reception of a reciprocating rod 16. The rod 16, at its lower end and beneath the guide member 14 is provided with a chuck 17 which carries a suitable cutting tool 19. The guide member 14 is provided with a depending U-shaped member 20 having its horizontally disposed portion 21 located above the die 9, and this horizontally disposed portion is provided with a passage 22 alining with the passage 15 and arranged to receive the cutting tool 19 as will be readily understood.

The base member 5 is provided with a cutting blade 24 which is disposed in a vertical plane, and which is provided with a beveled upper cutting edge 25. Rearwardly of the standards 11 and 12 respectively the base member is provided with similar standards 26 and 27, and pivotally mounted between these standards upon a transverse pin shown at 28 there is provided a cutting knife 29 having a beveled lower cutting edge 30 for coöperation with the cutting edge of the just described knife. As shown, the pin 28 passes through a depending rearward portion 29' of the knife 29, and through an upwardly extending rearward portion 24' of the blade 24. Adjacent to the outer end, the knife 29 is provided with an enlarged head 31 which is forked as shown at 32, the legs of the forked portion being engaged in horizontally disposed grooves 33 formed in the chuck 17 at opposite sides thereof. A brace member 34 is carried by the base member 5 and is secured by means of bolts 35 between the standards 11 and 12 and 26 and 27.

The enlargements 13 formed upon the standards 11 and 12 at their upper ends receive a horizontal driven shaft 36 which carries an eccentric 37 which is disposed between the enlarged portions 13, and this eccentric is connected by means of a strap 38 to a link 39 pivotally connected as shown at 40 to the rod 16. The driven shaft is provided with a gear wheel 41 in mesh with a pinion 42 carried by a drive shaft 43 which is also mounted for rotation in the standards 11 and 12 adjacent to their upper ends. The drive shaft is provided with a belt wheel 44 which may receive power from a suitable motor.

The drive shaft is provided with a collar 45 arranged to receive the forked portion 46 of a pivotally mounted lever 47 carried by the standard 11. It will thus be seen that the drive shaft may be moved in a horizontal plane to engage or disengage the pinion 42 from the gear wheel 41. It will thus be seen that as power is applied to the drive shaft just described power will be transmitted to the driven shaft, and by means of the eccentric carried thereby a reciprocating motion will be imparted to the link 39 for operating the cutting tool 19. During the operation of the cutting tool 19 it is obvious that by means of the connections between the knife 29 and the chuck of the cutting tool a rocking motion will be imparted to said knife.

In the modified form of my invention shown in Fig. 7, the drive shaft is provided with a squared portion 50 which receives an operating lever 51 whereby the machine may be manually operated by rocking the lever as is obvious.

In the modified form of my invention shown in Fig. 8 the drive shaft is provided with a ratchet wheel 52 for engagement with a dog 53 carried by a lever 54 which is loosely mounted upon the drive shaft. It will thus be seen that upon rocking the lever 54 the gear 41 will be operated through the medium of the pinion 42 previously described. It will be apparent that the last two forms of my invention are especially adapted for use in light work.

What is claimed is:

1. A machine of the class described comprising upright standards, a horizontal shaft mounted at the upper end of the standards, a guide mounted between the standards below the shaft, a rod slidably engaged in the standards for vertical movement, eccentric connections between the rod and the shaft for vertical movement of the rod when the shaft is revolved, means for revolving the shaft, a clutch carried by the rod below the guide, said clutch having diametrically opposite grooves therein, a fixed blade, and a knife pivoted for movement to coöperate with the fixed blade, said knife having arms at one end engaged in the grooves of the chuck.

2. A machine of the class described comprising a reciprocating rod including a tool holding chuck carried thereby, a stationary member having arms, and a rocking member engaged with the chuck said rocking member arranged for operation for movement toward and away from the stationary member.

3. In a combined punching and shearing machine, the combination with a vertically movable member, of a chuck carried by the member, said chuck having diametrically opposite grooves therein, a fixed blade, a knife disposed for coöperation with the blade, said knife extending radially from the chuck and being pivotally mounted at its end a distance from the chuck and arms carried by the knife at its end adjacent to the chuck, said arms being engaged in the grooves of the chuck.

4. In a structure of the class described, the combination with a base member of upwardly extending forward and rearward pairs of standards connected with the base member, a blade located between the lower portion of the standards, a knife pivoted between the rearward standard for movement to coöperate with the blade, a guide secured between the forward standards, a rod movable vertically through the guide, means for attaching a cutting tool to the lower portion of the rod, connections between the attaching means and the knife for vertical movement of the knife upon its pivots when the rod is moved, and means connected with the upper ends of the forward standard for vertical movement of the rod.

In testimony whereof I affix my signature, in presence of two witnesses.

HENRY N. KLUTING.

Witnesses:
   H. H. ANDREW,
   GEO. T. SHANE.